United States Patent [19]
Bobear

[11] 3,723,481
[45] *Mar. 27, 1973

[54] ABLATIVE COATING COMPOSITIONS

[75] Inventor: William J. Bobear, Latham, N.Y.

[73] Assignee: General Electric Company, Waterford, N.Y.

[*] Notice: The portion of the term of this patent subsequent to Apr. 14, 1987, has been disclaimed.

[22] Filed: Sept. 22, 1969

[21] Appl. No.: 860,121

Related U.S. Application Data

[63] Continuation of Ser. No. 588,313, Oct. 21, 1966, abandoned, which is a continuation-in-part of Ser. No. 470,892, July 9, 1965, Pat. No. 3,506,607.

[52] U.S. Cl. ............................................... 260/37 SB
[51] Int. Cl. .............................................. C08g 51/04
[58] Field of Search ........................... 260/37, 46.5 G

[56] References Cited

UNITED STATES PATENTS

| | | | |
|---|---|---|---|
| 3,328,481 | 6/1967 | Vincent | 260/825 |
| 3,455,732 | 7/1969 | Hathaway | 260/37 SB X |
| 3,506,607 | 4/1970 | Bobear | 260/37 SB |
| 3,114,721 | 12/1963 | Bobear | 260/46.5 G X |
| 3,274,145 | 9/1966 | Dupree | 260/37 SB |
| 3,317,455 | 5/1967 | Blome et al. | 260/37 SB |
| 3,344,106 | 9/1967 | Wu | 260/37 SB |
| 3,240,731 | 3/1966 | Nitzsche et al. | 260/37 SB X |

OTHER PUBLICATIONS

Material in Design Engineering; Vol. 54, No. 7; Dec. 1961; page 97.
Meals et al.: Silicones; Reinhold Plastics Applications Series; Reinhold Publishing Corp.; 1959; pages 95 and 96

*Primary Examiner*—Lewis T. Jacobs
*Attorney*—William A. Teoli et al.

[57] ABSTRACT

A silicone elastomer which is quite useful as an ablative coating composition comprises (A) an organopolysiloxane having a ratio of from about 1.95 to about 2.01 organo radicals per silicon atom consisting essentially of alkyl and aryl radicals in which the ratio of aryl radicals to silicon can have a value of from about 0.20 to about 0.60, inclusive, (B) a reinforcing amount of a silica filler, (C) an effective amount of a member selected from the class of metals, metalloids and mixtures thereof of elements of Groups IIA, IIIB, IVB, VB, VIB, VIIB, VIII, IB, IIB, IIIA, IVA, and VA of the Periodic Table of Elements, and (D) a char reinforcing material.

7 Claims, No Drawings

ABLATIVE COATING COMPOSITIONS

This application is a continuation of copending application Ser. No. 588,313, filed Oct. 21, 1966, now abandoned, which in turn is a continuation - in - part of application Ser. No. 470,892, filed July 9, 1965, now U.S. Pat. No. 3,506,607, issued Apr. 14, 1970, and assigned to the same assignee as the present invention.

This invention relates to ablative thermal insulating coating compositions. More particularly, the present invention relates to organopolysiloxane compositions convertible to the elastomeric state containing certain finely divided elemental metal or metalloid.

As is generally known to those skilled in the art, ablation is a process in which, through combined thermal, chemical, and mechanical degradation, materials dissipate energy with an attendant loss of surface material. The earliest ablative materials known were meteorites which demonstrated, in principle, the utility of aerodynamic ablation for thermally protecting objects traveling through the atmosphere at speeds greatly in excess of the speed of sound.

With the advent of the space age, a great deal of research has been directed toward formulating ablation compositions which would be useful in thermally insulating space vehicles and various re-entry systems. A wide variety of materials have been investigated including organic, inorganic and orgamometallic materials. Organosilicon materials have been found to possess a unique combination of properties and characteristics which qualify them as especially suitable for making ablation compositions.

Among the well-known properties of silicone rubber for example, are its superior resistance to heat, electrical properties, unequaled resistance to extended heat-aging and weathering, resistance to fungus growth, high degree of water repellency, and good radiation resistance. In addition, its unique low temperature flexibility makes it particularly valuable in the arctic regions where conventional organic materials could not be employed.

As a result of the many compositions tested, certain general rules have been formulated as to what constitutes a good ablative material. Among these characteristics are a low density and a low thermal conductivity. It has in fact, been stated that the thermal conductivity of a material has a definite bearing upon the thermal insulative performance of an ablative material. The lower the value of the conductivity, the lower the temperature that can be maintained in the underlying substrate.

The present invention is based on the discovery that the inclusion of a variety of elemental metals and metalloids in certain silicon rubber compositions result in improved ablation properties. This result is quite surprising since metals generally exhibit high thermal conductivity. It would be surprising therefore to expect that the inclusion of thermally conductive materials in ablation compositions would actually improve the thermal insulating qualities of the material with respect to backside temperature rise. However, it has been found that valuable results are achieved when one or more of a variety of elemental metals or metalloids are incorporated in certain silicone rubber compositions. For example, the backside temperature rise of the resulting material, i.e. the surface in contact with the area to be shielded is lowered. In addition, the rate of surface recession (ablation velocity) of the material which is exposed to environmental conditions that cause ablation, such as high temperature plasma, is also reduced.

In accordance with the present invention, there are provided elastomeric forming organopolysiloxane ablative coating compositions for protecting the surface of aerospace vehicles from the eroding effects of gases at elevated temperatures comprising (A) an organopolysiloxane having a ratio of organo radicals per silicon atom which has a value of from about 1.95 to about 2.01, inclusive, consisting essentially of alkyl and aryl radicals, in which the ratio of aryl radicals to silicon can have a value of from about 0.20 to about 0.60, inclusive, (B) a reinforcing amount of a silica filler, (C) an effective amount of a member selected from the class of metals, metalloids and mixtures thereof of elements of Groups IIA, IIIB, IVB, VB, VIB, VIIB, VIII, IB, IIB, IIIA, IVA, and VA of the Periodic Table of Elements, and (D) a char reinforcing material.

Included among the organopolysiloxanes which can be employed for making the ablative compositions of the present invention, are organopolysiloxanes having the formula, (1) 

where R is selected from aryl radicals and halogenated aryl radicals, R' is selected from alkenyl radicals, and R'' is selected from alkyl radicals, $a$ has a value of from about 0.20 to about 0.60, inclusive, $b$ has a value of from about 0.0005 to about 0.02, inclusive, the ratio of $a/b$ has a value of less than 150, $c$ has a value of from about 1.33 to about 1.81, and the sum of $a$, $b$, and $c$ is equal to from 1.95 to 2.01, inclusive.

The organopolysiloxanes utilized in the present invention, as shown by formula 1, are convertible to the cured, solid, elastic state through the use of well-known means, such as by heating in the presence of a cross-linking agent, for example, benzoyl peroxide or bis(2,4-dichlorobenzoyl)peroxide, utilization of high energy radiation, etc. Most generally, these convertible organopolysiloxane gums have viscosities in the range of from 100,000 to 100,000,000 centipoises at 25°C. Methods for manufacturing these convertible organopolysiloxane gums are well known in the art, some of the methods being shown in Sprung Pat. No. 2,484,595 and Warrick Pat. No. 2,460,795. For example, mixtures of cyclic organopolysiloxanes such as octamethylcyclotetrasiloxane, octaphenylcyclotetrasiloxane, methylvinylcyclotetrasiloxane, etc. can be equilibrated with for example, alkaline catalyst, such as potassium hydroxide, etc. to obtain the desired convertible organopolysiloxane gum.

In addition to the organopolysiloxanes of formula 1, there also can be utilized to make the ablation compositions of the present invention, organopolysiloxanes of the formula, (2) 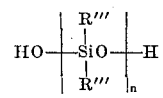

where $n$ is a positive integer of from about 50 to about 10,000, inclusive, R''' is selected from R radicals and R'' radicals, in which the ratio of R radicals to silicon can have a value of from about 0.20 to about 0.60, inclusive. Methods for making the organopolysiloxanes of formula 2 are well known and are shown for example in Berridge Pat. No. 2,843,555, assigned to the same assignee as the present invention.

Among the radicals included by R, are for example, phenyl, chlorophenyl, tolyl, xylyl, biphenyl, naphthyl, etc. Radicals included by R' are for example, vinyl, allyl, cyclohexenyl, etc. Radicals included by R'' are for example, methyl, ethyl, propyl, butyl, octyl, dodecyl, etc. In formula 1, R, R' and R'' can represent all of the same radicals respectively or mixtures of such radicals as defined above.

The reinforcing silica fillers which are employed in the ablation compositions of the present invention can have an average particle size in the range of between 0.005 microns to 0.100 microns. There are included for example, silica aerogels, fumed silica, precipitated silicas. In addition, minor amounts of other fillers also can be employed such as finely divided iron oxide, titanium dioxide, zinc oxide, albacar, lead oxide, etc. The amount of filler which can be employed can vary between 10 to 300 parts by weight of filler per 100 parts of organopolysiloxane, and preferably from 25 to 100 parts by weight of filler.

Cure of the ablative coating compositions comprising organopolysiloxanes of formula 1 can be achieved with benzoyl peroxide, tertiary butyl perbenzoate, bis-(2,4-dichlorobenzoyl)peroxide, tertiary butyl peroxy isopropyl carbonate, tertiary butyl peroxy 2-ethyl hexanoate, etc. These cure accelerating agents can be present in varying amounts, ranging from about 0.01 percent to as high as 6 to 10 percent by weight, or more, based on the weight of the convertible organopolysiloxane. Instead of employing such chemical curing agents, curing of the convertible organopolysiloxane can be accelerated with high energy electrons, among other means.

In instances where organopolysiloxanes of formula 2 are utilized in the ablative coating compositions of the present invention, room temperature cure of the composition can be achieved with curing agents as shown by the formula,

where R'' is defined above, and Y can be R'' or OR''. For example, tetraethylsilicate can be employed in combination with certain metallic salts of organic carboxylic acids, such as tin octoate as taught in the aforementioned Berridge patent. In particular applications, curing agents can be utilized as shown by the formula,

for example, methyltriacetoxysilanes which effect cure on contact with moisture, as taught in copending application of C. L. Smith, et al., Serial No. 221,326, filed Sept. 4, 1962 and assigned to the same assignee as the present invention.

Elemental metals and metalloids which can be utilized in the ablative compositions of the present invention, are those metals and metalloids selected from Groups IIA, IIIB, IVB, VB, VIB, VIIB, VIII, IB, IIB, IIIA, IVA, and VA of the Periodic Table of Elements. The Periodic Table of Elements can be found in the Handbook of Chemistry, N.A. Lange, 10th Edition, (1961) McGraw-Hill Book Co., Inc., New York, N. Y., Pages 56-7. More particularly, there can be employed beryllium, magnesium, calcium, strontium, barium, scandium, yttrium, lanthanum, titanium, zirconium, hafnium, vanadium, niobium, tantalum, chromium, molybdenum, tungsten, manganese, technetium, rhenium, iron, cobalt, nickel, ruthenium, rhodium, palladium, osmium, iridium, platinum, copper, silver, gold, zinc, cadmium, mercury, boron, aluminum, gallium, indium, thallium, carbon, silicon, germanium, tin, lead, arsenic, antimony and bismuth.

It should of course be understood that any one of these elements or mixtures thereof can be used in a particular formulation to improve the ablative properties of the silicone rubber. Of the various metals and metalloids which can be employed, it is preferred to use finely divided silicon, boron, and mixtures thereof. These elemental metals and metalloids should be incorporated in the silicone rubber composition in an amount of from 0.01 to 100 parts, by weight, per 100 parts of organopolysiloxane. Preferably, the amount of elemental metal or metalloid is in the range of from 2 to 30 parts, by weight, per 100 parts of organopolysiloxane. It is essential, in order to obtain the best performance with the minimum amount of material, that these materials be present in a finely divided state. The particle size of the elemental metals and metalloids used in the composition of the present invention should be 177 microns or less, that is, small enough to pass through a standard 80 mesh screen. Preferably, the particle size of these materials is less than 74 microns, or small enough to pass through a 200 mesh screen.

Char forming reinforcing materials which can be employed in the practice of the invention are preferably fibrous materials such as asbestos, graphite fibers, certain types of glass fibers, etc. Depending upon the contact temperature to which the ablative coating is subjected, optimum results can vary with the particular type of fibers employed. Graphite fibers are preferred for example, at temperatures in the range of about 6,000°F. Asbestos can be satisfactorily utilized at temperatures around 1,200°F. Optimum results can be achieved with vitreous glass fibers composed of about 99% $SiO_2$. Glass fiber diameters preferably can range from 0.00005 to 0.0004 inch. Other types of fibrous glass can be utilized, such as "E-glass" which generally can be employed in electrical applications. In addition to the aforementioned preferred char reinforcing materials, there can be advantageously utilized, clays, carbon black, phenolic microballoons, etc. A proportion of from about 5 to about 75 parts of char forming reinforcing material can be employed, based on 100 parts of organopolysiloxane, and preferably about 5 to 50.

While I do not wish to be bound by theory, it is my belief that the improvement in ablation properties resulting from incorporation of the elemental metals and metalloids described is due to a chemical reaction between these materials and the silica filler which also is present. For example, at temperatures of about 1,000°C, the reaction between powdered silicon dioxide and powdered silicon, is as follows:

$$SiO_2 + Si \rightleftarrows 2SiO$$

requiring approximately 158,000 calories per mole. The reaction of silica with magnesium to produce silicon monoxide and magnesium oxide consumes about 43,000 calories, as a further comparison.

In order to enable those skilled in the art to better understand the practice of the present invention, the following examples are given by way of illustration and not by way of limitation. All parts are by weight.

As described in my copending application Ser. No. 470,892 filed July 9, 1965, the ablation characteristics of materials suitable for "low shear" areas on missile and space vehicles can be screened using an oxy-acetylene torch in combination with a thermocouple. This procedure has been effective for testing materials to be used for example, as a protective coating on the outside of rocket nozzles, and in missile base areas. The oxy-acetylene or low shear test can be satisfactorily employed to screen materials in the form of cured test slabs having dimensions of 4 × 4 × 0.25 inches as described in my aforementioned copending application.

Recently there has been an increasing amount of interest in materials exhibiting satisfactory ablation characteristics under much higher conditions of shear associated with certain types of re-entry. High flux and high temperature conditions also exist about certain areas of rocket engines such as in the aft closures. In view of the much higher flux and temperature requirements, the oxy-acetylene torch test cannot be employed to screen high shear materials.

The oxy-kerosene torch test has been developed to screen materials for high shear applications. Unlike the oxy-acetylene torch test, which maintains a cold wall heating rate of 40 – 80 BTU/ft.$^2$-sec., there is maintained in the oxy-kerosene torch test a cold wall heating rate of as high as 800 BTU/ft.$^2$-sec. As indicated in my copending application, to qualify under the oxy-acetylene torch test, a material must show an ablation velocity of 1.5 mils, or less per sec.; or expressed differently, a mass loss rate of 0.009 lb/ft.$^2$-sec. or less. In view of the fact that materials are consumed at a much higher rate under high shear conditions as compared to conditions of low shear, a much higher ablation velocity and mass loss rate can be tolerated. For example, instead of 1.5 mils or less per sec., an ablation velocity of 50 mils or less per second, or a mass loss rate of 0.35 lbs/ft.$^2$-sec. or less will satisfy the oxy-kerosene test conditions.

In the oxy-kerosene torch test, a special testing technique must be employed, due to the conditions of high shear utilized. The organopolysiloxane composition to be evaluated is molded to a ½ inch diameter cylinder and reinforced with a ½ inch diameter wood or plastic plug. The sample is anchored onto the base which extends 1 inch into the sample. The following table shows the test conditions utilized in the oxy-kerosene test to simulate high shear ablation conditions.

OXY-KEROSENE TORCH TEST CONDITIONS

| | |
|---|---|
| Oxygen Flow Rate, lb/min. | 1.25 |
| Kerosene Flow Rate, lb/min. | 0.513 |
| Mass Flow, lb/sec. | 0.0294 |
| Torch | Linde FSJ—3 Blowpipe |
| Initial distance from tip to sample, inches | 1.5 |
| Sample Size | 0.50 inch Dia. cylinder, Flat Face |
| Flame Temperature, °F | ≈ 3700 |
| Gas Velocity | ≈ Mach 2 |
| Stagnation Pressure, PSIA | 40 – 50 |
| Gas Enthalpy, BTU/lb. | ≈ 1800 |
| Cold Wall Heating Rate, BTU/Ft.$^2$-sec. | ≈ 800 |

In making the samples employed in the ablation tests, as shown in the examples below, organopolysiloxane polymers were employed composed of chemically combined dimethylsiloxy units, diphenylsiloxy units, methylvinylsiloxy units and either trimethylsiloxy units or dimethylvinylsiloxy units. Standard equilibration procedures were utilized to equilibrate in the presence of a base catalyst, various mixtures of octamethylcyclotetrasiloxane, octaphenylcyclotetrasiloxane, methylvinylcyclotetrasiloxane, hexamethyldisiloxa-1,3-divinyltetramethyldisiloxane, etc. In particular instances, organopolysiloxane polymers also were made composed of chemically combined dimethylsiloxy units, diphenylsiloxy units and terminal silanol radicals. These "vinyl free" organopolysiloxane polymers were cured with room temperature vulcanizing curing agents such as shown in Berridge Pat. No. 2,843,555 and Smith et al. application Ser. No. 221,326 filed Sept. 4, 1962, both assigned to the same assignee as the present invention.

Examples 1 – 7

The following table shows the results obtained when various peroxide cured organopolysiloxane elastomers were screened under the oxy-acetylene torch test, "oxy-acetylene", and the oxy-kerosene torch test, "oxy-kerosene". The organopolysiloxane elastomers utilized consisted of organopolysiloxane polymers composed of chemically combined dimethylsiloxy units, methylvinylsiloxy units and various amounts of diphenylsiloxy units. There was utilized about 35 parts of fume silica, per 100 parts of polymer, and about 4 parts of powdered silicon metal, per 100 parts of polymer. In the table, "$C_6H_5/Si$" is phenyl-to-silicon ratio, "$C_2H_3/Si$" is vinyl-to-silicon ratio, "A.V." is ablation velocity in mils/sec. and "M.L." is mass loss rate in lbs/ft.$^2$-sec.

TABLE I

| Example | $C_6H_5/Si$ | $C_2H_3/Si$ | Oxy-Acetylene A.V. | M.L. | Oxy-Kerosene A.V. | M.L. |
|---|---|---|---|---|---|---|
| - | 0 | 0.002 | .89 | .0052 | 90 | 0.53 |
| - | 0.11 | 0.002 | - | - | 80 | 0.50 |
| 1 | 0.24 | 0.002 | .88 | .0055 | 38 | 0.24 |
| 2 | 0.20 | 0.004 | 1.15 | .0070 | 49 | 0.30 |
| 3 | 0.30 | 0.004 | 0.79 | .0045 | 38 | 0.24 |
| 4 | 0.30 | 0.010 | - | - | 27 | 0.17 |
| 5 | 0.34 | 0.006 | 1.04 | .0069 | 20 | 0.13 |
| 6 | 0.40 | 0.004 | 0.71 | .0045 | 30 | 0.19 |
| 7 | 0.50 | 0.004 | 0.90 | .0058 | 30 | 0.19 |

As shown by the above results, compositions having a $C_6H_5/Si$ ratio of less than 0.20 failed the "high shear" or oxy-kerosene test; the ablation velocity (A.V.) in mils per second was greater than 50 and the mass loss rate (M.L.) in lbs/ft.$^2$-sec. was greater than 0.35. Those skilled in the art also know that a specification for rubber to be used as base heating insulation on rockets calls for a backside rise of no more than 100°F and an ablation velocity of no more than 1.5 mils per second under the conditions of the oxy-acetylene torch test, (low shear). All of the above silica filled organopolysiloxane compositions of Table I containing 4 parts of powdered silicon metal, per 100 parts of organopolysiloxane, showed a backside temperature rise of less than 100°F. Organopolysiloxane elastomers free of powdered silicon metal made in accordance with the organopolysiloxane elastomers of Table I, showed a backside temperature rise of greater than 190°F. Based upon the above results, those skilled in the art would know that silica filled organopolysiloxane elastomers of Examples 1 – 7, having powdered silicon metal and a $C_6H_5$/Si ratio of a value between 0.20 to 0.60 would be satisfactory as a protective shield for any part of a space vehicle subjected to both low shear and high shear conditions.

Examples 8 – 10

Organopolysiloxanes also were evaluated under conditions of high shear utilizing an oxy-kerosene torch to determine what the effect various additives had on "hardening" the char, as well as the adhesion of the char to the remaining rubber. An organopolysiloxane composition was utilized similar to that shown for Table I, in which the $C_6H_5$/Si ratio of the organopolysiloxane polymer had a value of 0.30 and the $C_2H_3$/Si ratio had a value of 0.004. In Table II, the Char Former was utilized at 15 parts per 139 parts of organopolysiloxane composition, consisting of 100 parts of polymer, 35 parts of silica filler and 4 parts of powdered silicon. "H" (hard) under char indicates that the char former reinforced the char; "S" (soft) indicates the char was not reinforced.

TABLE II

| Example | Char Former | Oxy-Kerosene Torch A.V. | M.L. | Char |
|---|---|---|---|---|
| - | None | 31 | 0.19 | S |
| 8 | Asbestos Fibers | 24 | 0.16 | H |
| 9 | Vitrous Glass Fibers | 26 | 0.17 | H |
| 10 | Graphite Fibers | 29 | 0.18 | H |
| - | Polyethylene | 28 | 0.17 | S |
| - | Nylon Fibers | 29 | 0.18 | S |

Those skilled in the art would know that char formers which hardened the char would provide for optimum ablation compositions. Under conditions of high shear, for example, a material which would harden the resulting char would result in a reinforced char structure. A reinforced char can continue to shield the primary load bearing structure more effectively.

EXAMPLES 11 – 17

Compositions are prepared as shown in Table I, except that in place of powdered silicon metal, there is utilized 12 parts of powdered boron, per 100 parts of organo-polysiloxane. Elastomers evaluated with the oxy-kerosene torch containing organopolysiloxane in which the phenyl-to-silicon ratio has a value between 0.20 to 0.60, show an ablation velocity less than 50 mils per sec. and a mass loss of less than 0.35 lbs/ft.$^2$-sec. The backside temperature rise of the boron-containing organopolysiloxane elastomers is less than 95°F.

Examples 18 – 24

Silanol-terminated methylphenylpolysiloxane having a viscosity of about 10,000 centipoises at 25°C and a phenyl to silicon ratio of a value of 0.34 is blended with 35 parts of fume silica, per 100 parts of polymer. The polymer is made by equilibrating a mixture of octamethylcyclotetrasiloxane and, octaphenylcyclotetrasiloxane in the presence of potassium hydroxide followed by decatalyzing the polymer with phosphorous acid. To the filler polymer blend there is added 30 parts of vitreous glass fibers composed of about 99 percent of $SiO_2$.

A portion of the above base mixture of methylphenylsiloxane, silica filler and glass fibers is blended with 10 parts of aluminum, in finely divided form. Cured samples in the form of slabs and ½ inch cylinders are made by molding the aforementioned aluminum filled base mixture at room temperature. Room temperature cure is effected with 4 percent by weight of tetraethylsilicate and 1 percent by weight of stannous octoate, based on the weight of methylphenylpolysiloxane. The same weight of several additional metals and metalloids, specifically copper, iron, nickel, tin, tungsten, and magnesium, in finely divided form are also blended with the above base mixture to produce additional curable mixtures. Cured slabs are also molded to shape from each of the resulting mixtures by the same method.

The various elastomeric cylinders containing aluminum, copper, iron, nickel, tin, tungsten, etc., are evaluated with oxy-acetylene torch and an oxy-kerosene torch in accordance with the above-described conditions. It is found that the backside temperature rise is less than 100°F. The ablation velocity under conditions of high shear is less than 50 mils/per sec. and the mass loss is less than 0.35 lbs/ft.$^2$-sec.

While the foregoing examples have of necessity been limited to only a few of the very many variables within the scope of the present invention, it should be understood that the present invention is directed to a much broader class of ablation compositions comprising an organopolysiloxane having a ratio of from about 1.95 to about 2 organo radicals per silicon atom consisting essentially of alkyl and aryl radicals in which the ratio of aryl radicals to silicon can have a value of from about 0.20 to about 0.60, inclusive. In addition, there can be utilized in these ablation compositions a much broader class of metal and metalloids as well as various char reinforcing materials.

What I claim as new and desire to secure by Letters Patent of the United States is:

1. An ablative organopolysiloxane composition having excellent ablative properties comprising (a) an organopolysiloxane having a viscosity of from 100,000 to 100,000,000 centipoises at 25°C and having a ratio of about 2 organo radicals per silicon atom consisting essentially of alkyl and aryl radicals in which the ratio of aryl radicals to silicon has a value of from about 0.20 to about 0.60, inclusive, (b) from about 10 to 300 parts by weight, per 100 parts of the organopolysiloxane of a reinforcing silica filler, (c) from 0.01 to 100 parts by weight of a metal and metalloid per 100 parts of the organopolysiloxane and mixtures thereof of elements of Groups IIA, IIIB, IVB, VB, VIB, VIIB, VIII, IB, IIB, IIIA, IVA and VA of the Periodic Table of Elements, and (d) from 5 to 75 parts by weight based on 100 parts of the organopolysiloxane material selected from the class consisting of asbestos fibers, graphite fibers, glass fibers, clay and carbon black.

2. An ablative organopolysiloxane composition in accordance with claim 1, in which the organopolysiloxane has the formula, (1) $(R)_a(R')_b(R'')_c SiO_{(4-a-b-c/2)}$, where R is selected from the class consisting of aryl radicals and halogenated aryl radicals, R' is selected from alkenyl radicals, and R'' is selected from alkyl radicals, $a$ has a value of from about 0.20 to about 0.60, inclusive, $b$ has a value of from about 0.0005 to about 0.02, inclusive, the ratio of $a/b$ has a value of less than 150 and $c$ has a value of from about 1.33 to about 1.81.

3. A composition in accordance with claim 1, in which the organopolysiloxane is a methylphenylpolysiloxane to which the ratio of the phenyl radicals to silicon is in the range of from about 0.20 to about 0.50.

4. A composition in accordance with claim 1, in which the silica filler is a fumed silica which is present in a proportion of from 25 to 100 parts per 100 parts of organopolysiloxane.

5. A composition in accordance with claim 1, in which the metalloid is silicon in a proportion of from about 2 to 30 parts per 100 parts of organopolysiloxane.

6. A composition in accordance with claim 1, in which the char reinforcing material is a member selected from the class consisting of glass fibers, graphite fibers, and asbestos fibers.

7. A composition in accordance with claim 1, in which the metalloid is boron.

* * * * *